United States Patent
Bianchini et al.

(10) Patent No.: US 11,092,793 B2
(45) Date of Patent: Aug. 17, 2021

(54) METHOD OF LIGHTENING AT LEAST ONE BIOLOGICAL SAMPLE, THREE-DIMENSIONAL HIGH RESOLUTION DEPLETION MICROSCOPY METHOD AND CORRESPONDING MICROSCOPE

(71) Applicant: Fondazione Istituto Italiano Di Tecnologia, Genoa (IT)

(72) Inventors: Paolo Bianchini, Genoa (IT); Takahiro Deguchi, Genoa (IT); Alberto Diaspro, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 16/766,658

(22) PCT Filed: Nov. 30, 2018

(86) PCT No.: PCT/IB2018/059492
§ 371 (c)(1),
(2) Date: May 22, 2020

(87) PCT Pub. No.: WO2019/106614
PCT Pub. Date: Jun. 6, 2019

(65) Prior Publication Data
US 2020/0363620 A1    Nov. 19, 2020

(30) Foreign Application Priority Data
Nov. 30, 2017  (IT) .................. 102017000137607

(51) Int. Cl.
*G02B 21/16* (2006.01)
*G01N 21/64* (2006.01)
(Continued)

(52) U.S. Cl.
CPC ......... *G02B 21/16* (2013.01); *G01N 21/6458* (2013.01); *G02B 21/22* (2013.01);
(Continued)

(58) Field of Classification Search
CPC .. G01N 21/6458; G02B 21/16; G02B 21/365; G02B 21/22; G02B 21/364
See application file for complete search history.

(56) References Cited

U.S. PATENT DOCUMENTS 9,946,057 B2 * 4/2018 Hufnagel .......... G02B 21/0088
2012/0320438 A1  12/2012 Knebel et al.

FOREIGN PATENT DOCUMENTS

CN       102540476 B      1/2014

OTHER PUBLICATIONS

Bianchini, Paolo et al. "STED nanoscopy: a glimpse into the future", Cell and Tissue Research, vol. 360, No. 1, Mar. 6, 2015, 8 pages.

(Continued)

*Primary Examiner* — David P Porta
*Assistant Examiner* — Fani Boosalis
(74) *Attorney, Agent, or Firm* — Loza & Loza, LLP

(57) ABSTRACT

Lightening method of at least one biological sample (S), in which said at least one biological sample includes at least one or more fluorophores, at the focal point (F) of at least one objective lens (L) having a main optical axis (z-z), the method comprising the following operational steps:—lightening (step 10) said at least one biological sample (S) with at least one excitation beam (EB), which propagates between said at least one objective lens (L) and said at least one biological sample (S) along at least one first propagation axis (a-a);—lightening (step 20) said at least one biological sample (S) with at least two depletion beams (DB, DB'), which propagate between said at least one objective lens (L)

(Continued)

and said at least one biological sample (S) along the respective second propagation axes (b-b, said depletion beams being donut-shaped, each one in a plane orthogonal to the respective second propagation axis (b-b, b'-b'); whereby said at least one first propagation axis (a-a) and said at least second propagation axes (b-b, b'-b') are angularly inclined with each other, and said at least one first propagation axis (a-a) and said second propagation axes (b-b, b'-b') intersect on said at least one biological sample (s) only at the focal point (F) of said at least one objective lens (L), so that an effective fluorescence volume (FV) is generated in said at least one biological sample (S) which is limited both orthogonally and axially with respect to said main optical axis (z-z).

20 Claims, 7 Drawing Sheets

(51) Int. Cl.
    *G02B 21/22*     (2006.01)
    *G02B 21/36*     (2006.01)

(52) U.S. Cl.
    CPC ..... *G02B 21/365* (2013.01); *G01N 2201/061* (2013.01); *G01N 2201/0675* (2013.01)

(56) References Cited

OTHER PUBLICATIONS ntemational Search Report for application PCT/IB2018/059492, dated Mar. 18, 2019, 3 pages.

\* cited by examiner

METHOD OF LIGHTENING AT LEAST ONE BIOLOGICAL SAMPLE, THREE-DIMENSIONAL HIGH RESOLUTION DEPLETION MICROSCOPY METHOD AND CORRESPONDING MICROSCOPE

The present invention relates to a depletion microscopy method having three-dimensional or 3D high resolution based on the principle of Reversible Saturable Optical Linear Fluorescence Transitions (or RESOLFT: Reversible Saturable Optical Linear Fluorescence Transitions) of the molecules of a biological sample under investigation and, more particularly, the present invention relates to a method of lightening such a biological sample. The present invention also relates to a respective microscope.

The present invention is particularly applicable to a stimulated emission depletion microscopy method or STED microscopy (stimulated emission Depletion) and to a corresponding microscope.

As is known, super-resolution (SR) fluorescence microscopy has reached a spatial resolution well beyond the limit of diffraction and such an increase in resolution, theoretically unlimited, is obtainable in all three dimensions (3D) of a sample and is available for studying biological samples (as can be seen, for example, from the following articles: F. Huang et al., "Ultra-High Resolution 3D Imaging of Whole Cells," Cell, vol. 166, no. 4, pp. 1028-1040, August 2016; G. Shtengel et al., "Interferometric fluorescent super-resolution microscopy resolves 3D cellular ultrastructure," Proceedings of the National Academy of Sciences, vol. 106, no. 9, pp. 3125-3130, February 2009; H. Singh et al., "Visualization and quantification of cardiac mitochondrial protein clusters with STED microscopy," Mitochondrion, vol. 12, no. 2, pp. 230-236, March 2012; e J. Chojnacki et al., "Maturation-Dependent HIV-1 Surface Protein Redistribution Revealed by Fluorescence Nanoscopy," Science, vol. 338, no. 6106, pp. 524-528, October 2012).

An increasing number of applications of SR microscopy relates to the imaging on living biological samples and in vivo.

The majority of studies carried out at the moment has, however, regarded the analysis of processes or biological structures located in thin samples, for example of thickness less than 10 μm, although in this field the need is also felt to view biological activities in thicker samples, typically having a thickness greater than or equal to 10 μm, up to several hundreds of μm, and non-transparent, that are not homogeneous from the optical point of view, for example, in the case of functional imaging of the brain of mice or display of molecular dynamics in models of 3D crops of tumors (as described in: T. Grotjohann et al., "Diffraction-unlimited all-optical imaging and writing with a photochromic GFP," Nature, vol. 478, no. 7368, pp. 204-208, October 2011; I. Testa, N. T. Urban, S. Jakobs, C. Eggeling, K. I. Willig, and S. W. Hell, "Nanoscopy of Living Brain Slices with Low Light Levels," Neuron, vol. 75, no. 6, pp. 992-1000, September 2012; and Malin Åkerfelt et al., "Automated tracking of tumor-stroma morphology in microtissues identifies functional targets within the tumor microenvironment for therapeutic intervention," Oncotarget, vol. Vol. 6, no. No. 30, September 2015.)

Both of these applications require a high resolution at depth which is much greater than that at which SR techniques are mostly used (up to 10-15 μm in depth) and the imaging in depth (or deep imaging in technical jargon) in those samples is, therefore, complicated to implement with traditional SR approaches.

In general, in fact, the greater the depth in the sample to which imaging is carried out, the more complex becomes the reconstruction of the corresponding image. In fact, especially in samples of living material, the optical aberration caused by a lack of homogeneity of the refractive index can compromise the increase of resolution.

Recent improvements obtained in compensation strategies (optical clearing) and of combination of (refraction) index, in the technical jargon index matching, make a SR imaging at greater depth possible (see: M.-T. Ke et al., "Super-Resolution Mapping of Neuronal Circuitry With an Index-Optimized Clearing Agent," Cell Reports, vol. 14, no. 11, pp. 2718-2732, March 2016).

Unfortunately, these techniques are intrinsically limited to fixed samples, therefore the development of 3D SR microscopy in thick and living samples is still a complex and open issue.

Depletion microscopy by stimulated emission (STED) was the first SR technique that experimentally showed the use of the concept of Reversible Saturable Optical Linear Fluorescence Transitions (RESOLFT) and its ability of fast acquisition of images has allowed a visualization of biological dynamics (see: J. B. Ding et al., "Supraresolution Imaging in Brain Slices using Stimulated-Emission Depletion Two-Photon Laser Scanning Microscopy," Neuron, vol. 63, no. 4, pp. 429-437, August 2009; N. T. Urban et al., "STED Nanoscopy of Actin Dynamics in Synapses Deep Inside Living Brain Slices," Biophysical Journal, vol. 101, no. 5, pp. 1277-1284, September 2011; e P. Bethge et al., "Two-Photon Excitation STED Microscopy in Two Colours in Acute Brain Slices," Biophysical Journal, vol. 104, no. 4, pp. 778-785, February 2013.)

As is known, in a STED microscope, one sample of a biological material under investigation, included in a volume of observation, is hit with an excitation beam to which a second donut shaped beam, so-called depletion beam, is superimposed, designed to de-energize (mute), by stimulated emission, one part of the fluorophores present in the observed sample (see: Bianchini Paolo et al., "STED nanoscopy: a glimpse into the future", Cell and Tissue Research, Springer, Del., vol. 360, no. 1, 6 Mar. 2015 (2015-03-06) pages 143-150, XP 035477254, ISSN: 0302-766X, DOI: 10.1007/S00441-015-2146-3).

Since the intensity of the depletion beam is shaped so as to silence the fluorophores located only at the periphery of the volume of observation wherein the biological sample under investigation is comprised, the effective fluorescence volume is reduced to one dimension of sub-diffraction and the corresponding fluorescence signal can be acquired and processed in one image having an increased resolution compared to microscopy techniques that do not employ the depletion beam.

This type of approach, generically called RESOLFT, can increase the resolution using different methods of depletion depending on the characteristics of the fluorescent molecules in the biological sample, for example as mentioned above, by means of a process of stimulated emission (cfr. W. Hell et al., "Breaking the diffraction resolution limit by stimulated emission: stimulated-emission-depletion fluorescence microscopy," Opt. Lett., vol. 19, no. 11, pp. 780-782, June 1994), or through exited triplet states (cfr. S. W. Hell et al., "Ground-state-depletion fluorescence microscopy: A concept for breaking the diffraction resolution limit," Appl. Phys. B, vol. 60, no. 5, pp. 495-497, May 1995) or by means of a process of reversible photo switching (photoswitching) (cf. M. Hofmann et al., "Breaking the diffraction barrier in fluorescence microscopy at low light intensities by using reversibly photoswitchable proteins," Proceedings of the National Academy of Sciences of the United States of America, vol. 102, no. 49, pp. 17565-17569, December 2005), and so forth.

With reference to deep imaging, STED microscopy has reached a resolution equal to about 60-80 nm in typical organ brain slices, at depths up to 120 μm (cfr. Curdt, F. et al., "isoSTED nanoscopy with intrinsic beam alignment", Opt. Express 23, 30891-30903 (2015)). However, in this study, the increase in resolution is only found along the lateral direction, i.e. along the plane perpendicular to the main optical axis of the STED microscope, while the resolution along the axial direction has remained unchanged. Not only that, the configuration of the corresponding lens system limits the maximum thickness of the biological sample that can be analysed, which is why such a system is not suitable for deep imaging.

The bi-dimensional super resolution (SR 2D) above was obtained using a donut-shaped lateral depletion beam, created by a vortex phase plate, with propeller like step pitches $(0-2\pi)$.

This beam formed from by the vortex phase plate is known to be resistant to optical aberration, therefore the increase of the lateral resolution is well preserved in deep imaging.

On the other hand, in order to obtain a three-dimensional super resolution (also called 3D SR), i.e. a super-resolution also along the axial direction or optical axis, a STED beam or axial depletion beam was used, formed by a phase plate with a phase shift equal to $\pi$ at the center.

The intensity distribution of the axial depletion beam is known to be very sensitive to the discrepancy between refractive indices (see A. E. Mark et al., "Computational modeling of STED microscopy through multiple biological cells under one- and two-photon excitation," in Proceedings of SPIE, 2015, vol. 9330, p. 93300V), therefore the increase in resolution quickly degrades as the depth increases. Even with the use of adaptive optics (OA), which compensate for the optical aberrations, the maximum depth demonstrated in biologically intact tissue with the implementation of the axial depletion beam was 15 μm (see B. R. Patton et al., "Three-dimensional STED microscopy of aberrating tissue using dual adaptive optics," Opt. Express, OE, vol. 24, no. 8, pp. 8862-8876, April 2016.).

A potential approach to obtain a 3D SR by STED microscopy at high depth in biological samples uses a lateral depletion beam. This approach has been demonstrated experimentally on a relatively thin biological sample. With reference to deep imaging, the demonstrated tomographic technique is however limited to two aspects:

(i) it requires a mirror above the sample, therefore it is not suitable for thick samples, and (ii) it requires at least two images taken sequentially from different angles, therefore it is not suitable for fast imaging.

The object of the present invention is, therefore, to provide a lightening method of a biological sample in a depletion microscopy system and a corresponding depletion microscopy method, which allow to obtain an increase of the optical resolution, beyond the diffraction limit, in all three spatial dimensions, i.e. also in depth within a optically inhomogeneous sample.

Another object of the present invention is to provide a lightening method of a biological sample in a depletion microscopy system and a corresponding depletion microscopy method, which allow to obtain an increase of the optical resolution, beyond the diffraction limit, in all three spatial dimensions, i.e. also in thick samples.

A further object of the present invention is to provide a lightening method of a biological sample in a depletion microscopy system and a corresponding depletion microscopy method, which are easy to implement.

Yet another object of the present invention is to provide a corresponding microscope capable of implementing the lighting method and the depletion microscopy method referred to above, which is easy to produce at competitive costs.

It is a specific object of the present invention a lightening method of at least one biological sample, in which said at least one biological sample includes at least one or more fluorophores, at the focal point of at least one objective lens having a main optical axis, the method comprising the following operational steps:

lightening said at least one biological sample with at least one excitation beam, which propagates between said at least one objective lens and said at least one biological sample along at least one first propagation axis;

lightening said at least one biological sample with at least two depletion beams, which propagate between said at least one objective lens and said at least one biological sample along the respective second propagation axes, said depletion beams being donut-shaped, each one in a plane orthogonal to the respective second propagation axis;

whereby said at least one first propagation axis and said at least second propagation axes are angularly inclined with each other, and said at least one first propagation axis and said second propagation axes intersect on said at least one biological sample only at the focal point of said at least one objective lens, so that an effective fluorescence volume is generated in said at least one biological sample which is limited both orthogonally and axially with respect to said main optical axis.

According to another aspect of the invention, said step of lightening said at least one biological sample with at least two depletion beams, each along a respective second propagation axis, can comprise:

deliver at least one depletion radiation;

obtaining, from said at least one depletion radiation, at least two depletion beams; and supplying said at least two depletion beams, into a rear opening of said at least one objective lens, so that they enter into said rear opening substantially parallel to each other and to the main axis of said at least one objective lens, with the center of said rear opening of said at least one objective lens comprised between the centers of said two depletion beams, optionally at the same distance therefrom, whereby said two depletion beams exit from said at least one objective lens substantially inclined with each other.

According to a further aspect of the invention, said step of obtaining from said at least one depletion radiation at least two depletion beams, can comprise:

obtaining at least one donut beam, from said at least one depletion radiation, splitting said at least one donut beam into at least two donut beams, and combine said two donut beams in respective depletion beams which propagate substantially parallel to and spaced apart from each other, along a common path.

According to an additional aspect of the invention, said step of obtaining from said at least one depletion radiation at least two depletion beams can comprise one step of adjusting the mutual distance between said propagation axes of said depletion beams and, optionally, the distance between the center of said rear opening of said at least one objective lens and the center of each one of the two depletion beams.

According to another aspect of the invention, said at least two depletion beams can de-energize at least one sub-set of said at least one or more fluorophores into said biological sample by stimulated emission or relaxation of the triplet state or by means of a mechanism of photo switching of said at least one sub-set of said at least one or more fluorophores.

According to a further aspect of the invention, said step of lightening said at least one biological sample with at least one excitation beam along a first propagation axis, can comprise the steps of:
- delivering at least one excitation radiation in the form of at least one excitation beam; and
- supplying said at least one excitation beam, into a rear opening of said at least one objective lens, in such a way that it enters into said rear opening of said at least one objective lens substantially parallel or aligned with respect to said main axis, and it exits from said at least one objective lens substantially inclined or aligned with respect to said main axis.

It is also a specific object of the present invention, a depletion microscopy method of at least one biological sample including at least one or more fluorophores, at the focal point of at least one objective lens having a main optical axis, the method comprising the following operational steps:
- illuminating said at least one biological sample according to the lighting method described above;
- acquiring at least one fluorescence signal emitted from said at least one biological sample;
- processing said at least one fluorescence signal into an image of said at least one biological sample.

It is also a specific object of the invention a three-dimensional high resolution microscope, comprising:
- at least one source of an excitation radiation, configured to deliver at least one excitation radiation;
- at least one source of depletion radiation, configured to deliver at least one depletion radiation;
- at least one objective lens having a main optical axis and a focal point;
- at least one generation unit, configured to receive in input said at least one depletion radiation and to output the at least two depletion beams;
- one or more transmission elements configured to transmit said at least one excitation radiation in the form of at least one excitation beam, between said at least one source and said at least one objective lens, and transmit said at least two depletion beams between said at least one generation unit and said at least one objective lens;
wherein said at least one objective lens is configured to transmit said at least one excitation beam and said at least two depletion beams toward one biological sample, said at least one biological sample including at least one or more fluorophores and being comprised into an observation volume along said main optical axis and at the focal point of said at least one objective lens;
wherein said at least one generation unit, said transmission elements and said at least one objective lens are configured in such a way that when the microscope is in operation, said at least one excitation beam propagates between said at least one objective lens and said at least one biological sample along at least one first propagation axis, whereby said at least two depletion beams propagate between said at least one objective lens and said at least one biological sample along respective second propagation axes, so that said at least one first propagation axis and said second propagation axes intersect, on said at least one biological sample, only at the focal point of said at least one objective lens, for which an effective fluorescence volume is generated into said at least one biological sample, which is limited both orthogonally and axially with respect to said main optical axis.

According to another aspect of the invention, said at least one generating unit, can comprise:
- at least one shaping device of said depletion radiation, optionally a vortex phase plate, configured to receive in input said depletion radiation, and produce in output at least one donut beam;
- at least one beam splitting device, configured to receive in input said at least one donut beam, and output at least two donut beams,
- at least one combining device for said donut beams, configured to receive in input said at least two donut beams, and output said at least two depletion beams, with said respective second propagation axes parallel and spaced apart from each other.

According to a further aspect of the invention, said microscope can include adjusting devices for the distance between said second depletion beams, said adjusting devices for said distance being placed between said splitting device and said combining device and comprising a pair of translatable mirrors, each mirror being configured to redirect a respective donut beam toward said combining device.

According to a further aspect of the invention, said at least one generating unit can comprise:
- at least one spatial light modulator device, configured to receive in input said depletion radiation, and output at least two donut beams, which donut beams diverge from each other, and
- at least one pair of lenses, each set along the optical path of a respective donut beam, configured in such a way as to collimate and combine said at least two donut beams into said at least two depletion beams, having said respective second propagation axes parallel and spaced apart with respect to each other.

According to another aspect of the invention, said microscope can include adjusting devices, configured to adjust the distance between said at least two depletion beams, said adjusting devices for said distance comprising elements for varying the pattern of said spatial light modulator device.

According to a further aspect of the invention, said at least one source of depletion radiation can comprise two sources of depletion radiation, and said at least one generation unit can comprise:
- at least one shaping device configured to shape each depletion radiation, said at least one shaping device being optionally a vortex phase plate and being configured to receive in input one respective depletion radiation and output a respective donut beam; and
- at least one combining device of said donut beams, configured to receive in input one donut beam from each shaping device, and output said two depletion beams, with the respective propagation axes parallel and spaced between with each other.

According to an additional aspect of the invention, said microscope can include adjusting devices, configured to adjust the distance between said depletion beams, said adjusting devices for said distance being placed along the optical path between each shaping device and said combining device and comprising at least one translatable and/or tiltable mirror, each mirror being configured to redirect a respective donut beam toward said combining device.

According to another aspect of the invention, said microscope can comprise redirection elements, configured to redirect said at least one excitation beam and said at least two depletion beams, so that they enter into said rear opening of said at least one objective lens with the respective propagation axes not aligned and parallel with each other.

According to a further aspect of the invention, said at least one objective lens can be a lens having numerical aperture greater than or equal to 1.

The present invention will be now described, for illustrative but not limiting purposes, according to its preferred embodiments, with particular reference to the Figures of the accompanying drawings, wherein.

In the Figures the same reference numerals will be used for similar elements.

With reference now to FIGS. 1 to 6 it can be seen that the lighting method and the corresponding depletion microscopy method according to the present invention apply to a (three-dimensional) sample S of biological tissue, for example a tissue having a high thickness and not homogeneous from the optical point of view and including at least one or more fluorophores, which biological sample is placed in an optical system, at the focal point (F) of one objective lens (L) having an main optical axis (z-z).

Figure 2:
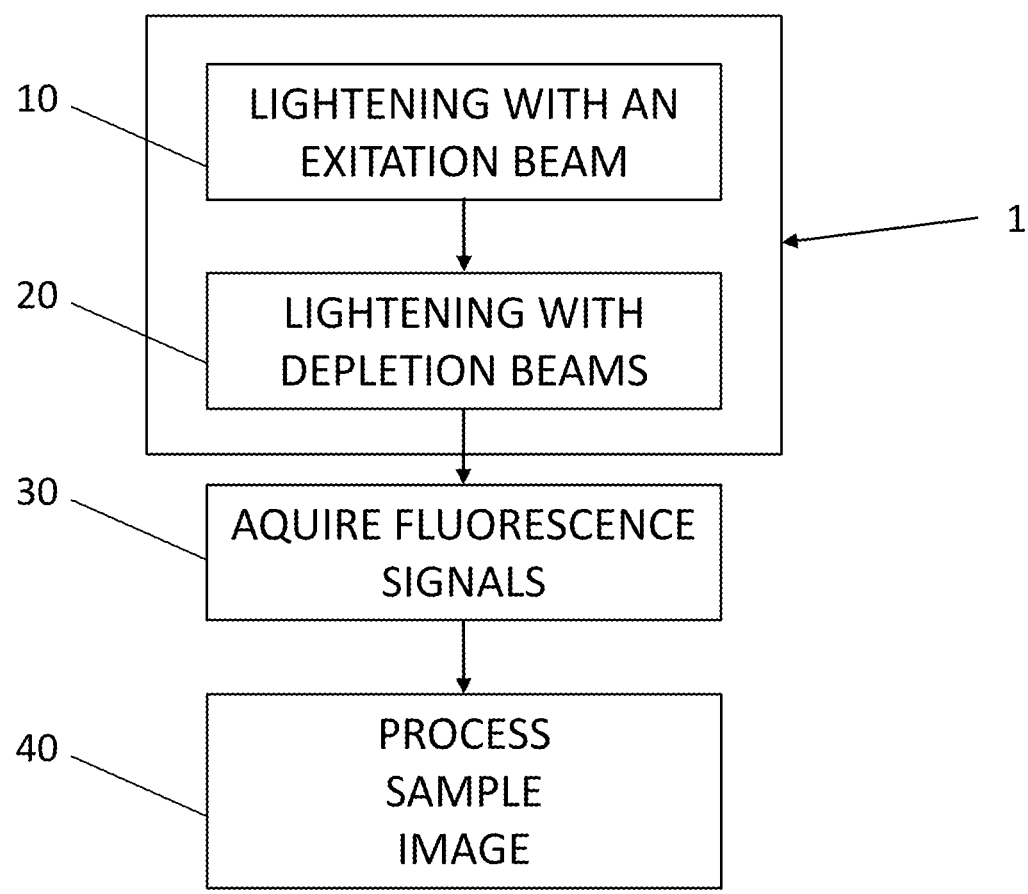
FIG. 2 shows a flow diagram of the main steps of a depletion microscopy method, according to the present invention.

With particular reference to the lightening method according to the present invention, that is depicted in FIG. 2 and globally indicated with the reference number 1, and comprises the following operating steps:

lightening (step 10) said at least one biological sample S with at least one excitation beam EB, which propagates between the objective lens L and said biological sample S along a first propagation axis (a-a), in order to energize said at least one or more fluorophores in said biological sample S; and lightening (step 20) such a biological sample S with at least two depletion beams DB and DB', which propagate between said objective lens L and said biological sample S along respective second propagation axes (b-b and b'-b'), to de-energize at least one sub-set of said at least one or more energised fluorophores, said depletion beams being donut-shaped, in a plane orthogonal to respective propagation axes (whereby said at least one sub-set of fluorophores that are de-energised is contained in such a donut, whose section on the plane which is orthogonal to the respective propagation axes forms a circular crown).

In the lightening method according to the present invention, said at least one first propagation axis (a-a) and said at least second propagation axes (b-b, b'-b') are angularly inclined with each other, and intersect in said at least one biological sample S, only at the focal point F of said at least one objective lens L, whereby an effective fluorescence volume FV is generated in said at least one biological sample S which is limited both orthogonally and axially with respect to said main optical axis (z-z) of the objective lens L.

Figure 3:
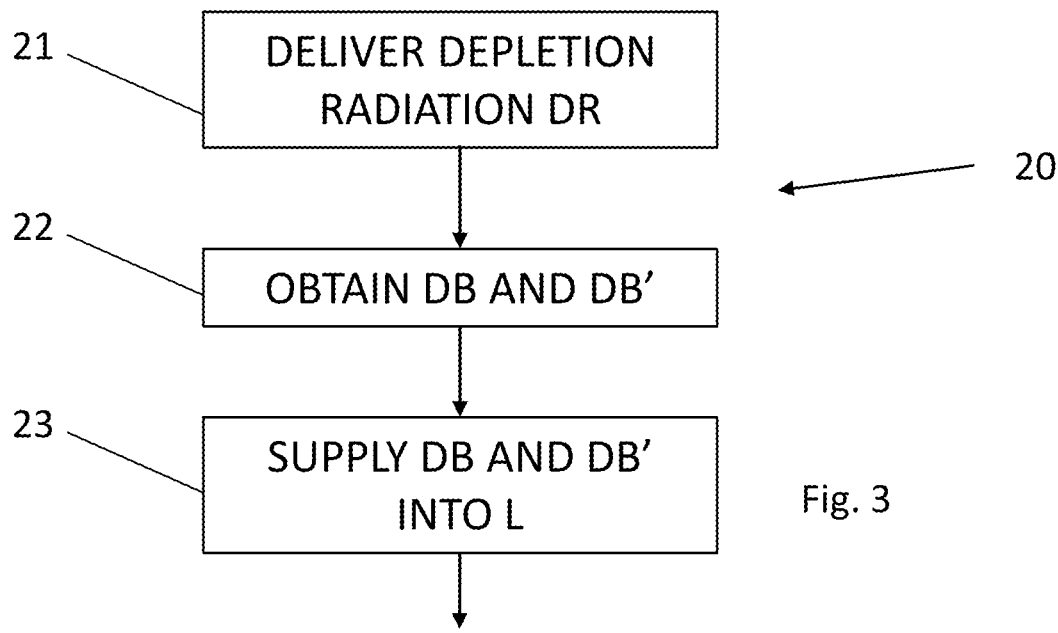
FIG. 3 shows a detail of the method of FIG. 2.
Figure 5A:
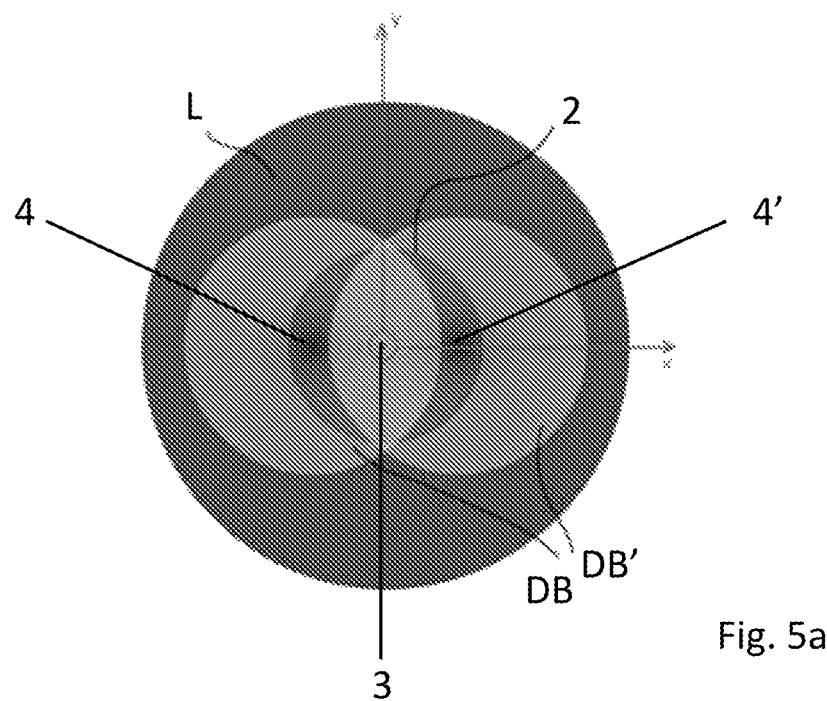
FIG. 5a shows a view of the depletion beams obtained by the lightening and microscopy method of the present invention, hitting in a plane orthogonal to the main optical axis of the objective lens of a respective microscope, at the rear opening of that objective lens.

With particular reference to the enclosed FIGS. 3 and 5a and step 20 of the lighting method according to the present invention, which comprises illuminating the biological sample S with at least two depletion beams DB and DB', each along a respective second propagation axis (b-b, b'-b'), said step further includes:

deliver (step 21) at least one depletion radiation DR;

obtaining (step 22), from said at least one depletion radiation DR, at least two depletion beams BD and BD'; and supplying (step 23) said at least two depletion beams BD and BD', into a rear opening 2 of said at least one objective lens L, so that these enter into said rear opening 2 substantially parallel to each other and to the main axis of said objective lens (z-z), with the center 3 of said rear opening 2 comprised between the centres (4, 4') of said two depletion beams BD and BD', optionally at the same distance therefrom, and exit from said at least one objective lens L substantially inclined with each other.

It should be clarified that in the present description the term "center", referring both to an excitation beam EB and the depletion beam (DB, DB'), is meant to indicate a point passing through the propagation axis of the respective beam, at a plane orthogonal to said propagation axis, for example in a plane delimited by the rear opening 2 of the objective lens L.

The inclination of the depletion beams in output from the objective lens, with respect to the main axis (z-z) of the objective lens, depends on the shape of the objective lens and the distance or offset (offset) of the propagation axes of such depletion beams, entering the rear opening 2, with respect to the main axis (z-z), and can be optionally comprised between 0°, not included excluded, and ±30°, more optionally comprised between ±5° and ±15°.

In any case, the shape of the objective lens L and the position of the centres 4 and 4' of the depletion beams, with respect to the center 3 of the rear opening 2 of the objective lens, are calibrated in such a way that the propagation axes of the excitation beam EB and the depletion beams DB and DB' intersect in the biological sample S under investigation, just at the focal point F of the objective lens L.

Step 22 of the lighting method according to the present invention, as will be seen better below, comprises, inter alia, a step for adjusting the mutual distance between the respective depletion beams DB and DB' and optionally of the distance between the center 3 of the rear opening 2 of the objective lens 1 and a respective center 4 or 4' of each one of the two depletion beam DB, DB'.

According to an advantageous aspect of the present invention, the depletion beams DB and DB' de-energize at least one sub-set of said at least one or more fluorophores into said tri-dimensional biological sample under investigation by stimulated emission or relaxation of the triplet state or by means of a mechanism of photo switching of said at least one sub-set of said at least one or more fluorophores. Therefore, the lightening method of the present invention can be advantageously applied to systems of RESOLFT microscopy in general, regardless of the manner in which the depletion beams are generated.

Figure 4:
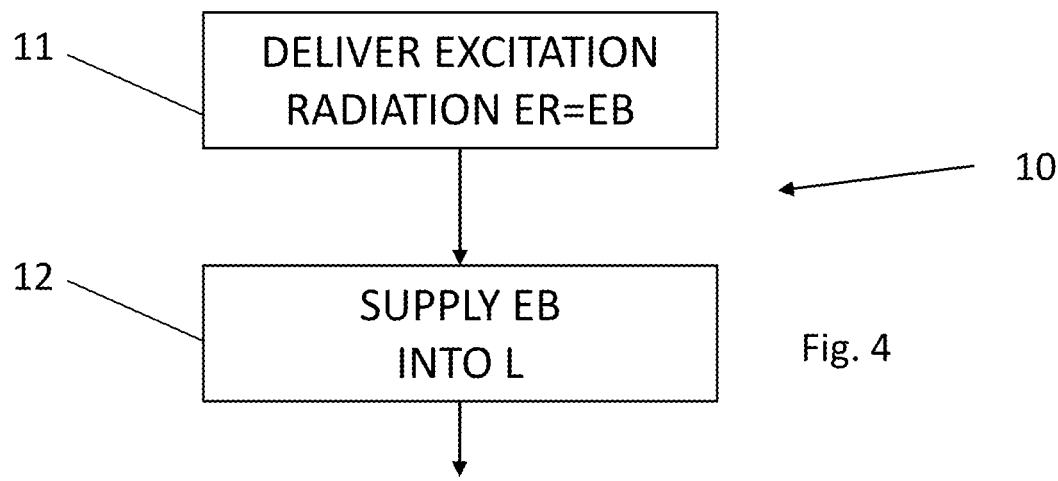
FIG. 4 shows a detail of the method of FIG. 2.
Figure 5B:
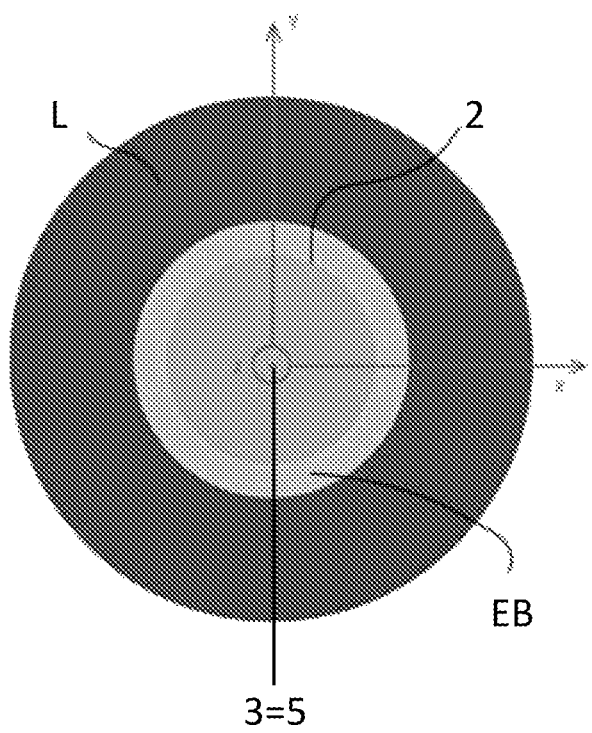
FIG. 5b is a representation of the view of the excitation beam obtained by the lightening and microscopy method of the present invention, hitting in a plane orthogonal to the main optical axis of the objective lens of a respective microscope, at the rear opening of that objective lens of FIG. 1.

With particular reference to enclosed FIGS. 4 and 5b and to step 10 of the lightening method according to the present invention, which comprises illuminating said at least one biological sample S, with at least one excitation beam EB, along at least one first propagation axis (a-a), in order to energize said at least one or more fluorophores in said at least one biological sample S, said step further includes:
- delivering (step 11) at least one excitation radiation ER in the form of at least one excitation beam EB; and
- supplying (step 12) said at least one excitation beam EB, into the rear opening 2 of said at least one objective lens L, in such a way that the excitation beam EB enters into said rear opening 2 of said objective lens L substantially parallel or aligned with respect to said main axis (z-z), and exits from said at least one objective lens L substantially inclined or aligned with respect to said main axis (z-z).

In fact if the excitation beam EB entered the rear opening 2 of the objective lens with its center 5 exactly at the center 3 of the objective lens, it would not undergo any inclination in output from the lens itself and therefore its propagation axis (a-a) would be coincident with the main axis (z-z) of the objective lens (case shown in FIG. 5b).

Vice versa, if it entered the through opening 2 of the lens L with its center 5 at a certain distance or offset (offset) from the center 3 of the objective lens L, it would emerge from the lens itself with a certain inclination (dependent on the shape of the objective lens L), and therefore its propagation axis (a-a) would not be coincident with the main axis (z-z) of the objective lens (case not shown in the Figures).

In any case, as it can be noted, the first propagation axis (a-a) of the excitation beam EB propagates with respect to the second axes of propagation (b-b and b'-b') of the depletion beams DB and DB' in such a way so as to allow to form, in the three-dimensional biological sample S under investigation, an effective fluorescence volume FV which is limited both "laterally" i.e. along one plane x-y perpendicular the main optical axis (z-z) of the objective lens, as already is for systems of traditional depletion microscopy, and along the main optical axis (z-z) of the objective lens L, thanks to the donut shaping (shaping) of the depletion beams, obtained optionally by means of a vortex phase plate (see FIG. 6, last column), as will be better explained in the following.

Figure 1:
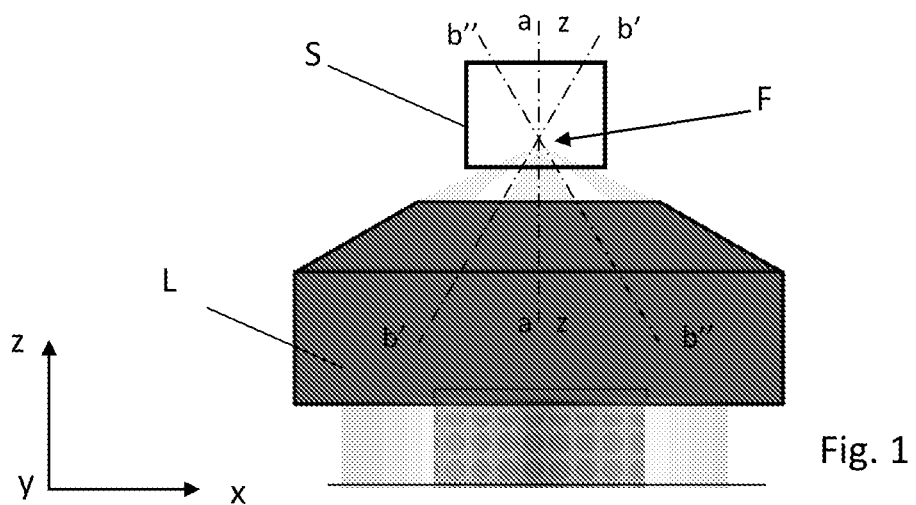
FIG. 1 is a schematic representation of one biological sample and one objective lens in a depletion microscopy system, capable of implementing the lightening and depletion microscopy method of the present invention.

As anticipated in the introduction, the lightening method described above can be advantageously applied to a depletion microscopy method, which also forms part of the present invention (FIG. 1).

Such a depletion microscopy method of at least one tri-dimensional biological sample S including at least one or more fluorophores, placed in an optical system, at the focal point F of at least one objective lens L having a main optical axis (z-z), comprises the following operational steps:
- lightening said at least one tri-dimensional biological sample S according to the lightening method 1 described above (steps 10 and 20);
- acquiring (step 30) at least one fluorescence signal emitted from said at least one biological sample S along a reflection path RB; and
- processing (step 40) said at least one fluorescence signal into one image of said at least one sample.

Since the steps 30 and 40 of the depletion microscopy method are certainly known to the person skilled in the art, they will not be described in further detail below.

Figure 7:
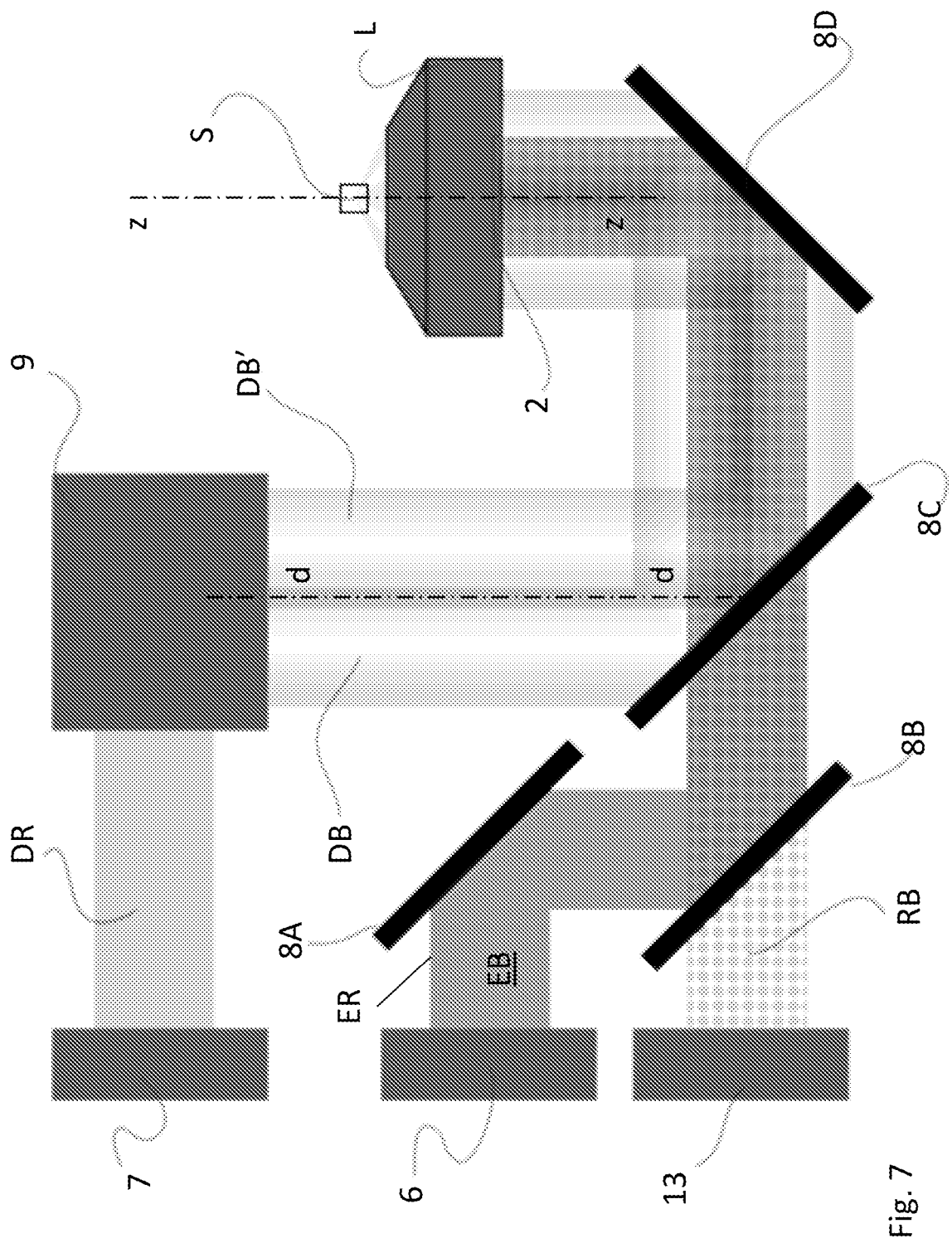
FIG. 7 shows a schematic representation of the main components of a depletion microscope, capable of implementing the method of the present invention.

The lightening method of one biological sample and the corresponding depletion microscopy method, are advantageously implementable by a depletion microscope, which forms the object of the present invention, comprising (see FIG. 7):
- at least one source 6 of the excitation radiation ER;
- at least one source 7 of the depletion radiation DR;
- one or more transmission elements 8A, 8B, 8c and 8D, configured for transmitting said at least one excitation radiation ER in the form of at least one excitation beam EB between said at least one source 6 and at least one objective lens L;
- at least one generation unit 9 of at least two depletion beams, configured to receive in input said at least one depletion radiation DR and to output the at least two donut shaped depletion beams DB and DB';
- at least transmission elements 8c and 8D, configured to transmit said at least two depletion beams DB and DB', between said generating unit 9 and said at least one objective lens L;
- at least one objective lens L, having a main optical axis (z-z) and a focal point F, which when the microscope is turned on, is configured to transmit said at least one excitation beam EB and said at least two depletion beams DB, DB' toward one biological sample S, including at least one or more fluorophores and included into one observation volume along said main optical axis (z-z) and at the focal point (F) of said objective lens (L).

Figure 6:
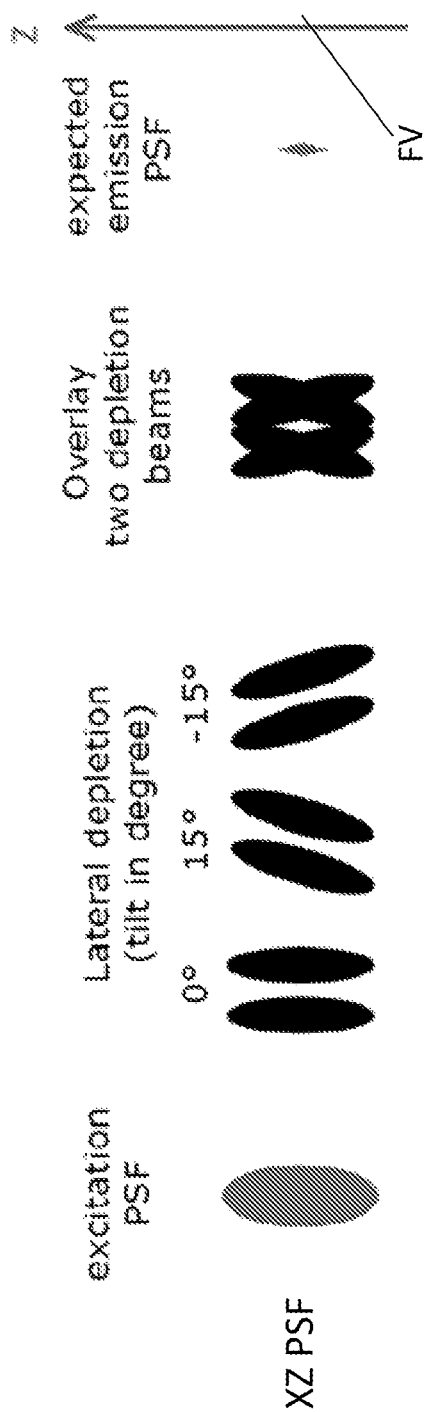
FIG. 6 shows the pattern of the point spread function or PSF of excitation, generated by: an excitation beam, two depletion beams shaped and inclined as provided by the present invention, the overlapping of the depletion beams along the main optical axis of the microscope, as well as the estimated fluorescence volumes, obtainable by the method of the present invention.

In the microscope according to the present invention, the generating unit 9, the transmission elements 8A, 8B, 8c and 8D and the objective lens L are configured in such a way that when the microscope is on:
- the at least one excitation beam EB propagates between said at least one objective lens L and said at least one biological sample S along one first propagation axis (a-a),
- the at least two depletion beams (DB, DB') propagate between said at least one objective lens L and said at least one biological sample S along respective second propagation axes (b-b, b'-b'), and
- the at least one first propagation axis (a-a) and the at least second propagation axes (b-b, b'-b') intersect on said at least one biological sample S, only at the focal point F of said at least one objective lens L, whereby an effective fluorescence volume FV is generated in said at least one biological sample S which is limited both orthogonally and axially with respect to said main optical axis (z-z) (see also FIGS. 1 and 6).

As a general rule, the generating unit 9 is substantially configured to generate one donut-shaped depletion beam, starting from the depletion radiation DR received, divide that donut-shaped beam into two separate beams and rebuild those two separated beams into two depletion beams, which propagate along one common propagation path (d-d), wherein the depletion beams are parallel and spaced apart from each other, i.e. they show the respective propagation axes not coincident therebetween.

In the microscope of the present invention, the transmission elements 8c and 8D, for example mirrors suitably positioned along the optical path of the depletion beams DB and DB', transmit the donut-shaped depletion beams DB and DB' thus generated in input to the rear opening 2 of the objective lens L of the microscope.

They enter into the opening 2 of the objective lens L with their propagation axes parallel to each other and to the main axis (z-z) of the objective lens and at a certain distance therebetween and are focal pointed, together with the excitation beam, on the focal point F of lens, delimiting one tri-dimensional effective fluorescence volume FV which is limited both in a direction orthogonal to axis (z-z) and along the axis (z-z).

One fluorescence beam thus generated by the fluorophores of the biological sample S excited inside the fluorescence volume FV, is reflected along one reflection path RB and captured by suitable sensing devices 13 located along the reflection path RB.

Figure 8:
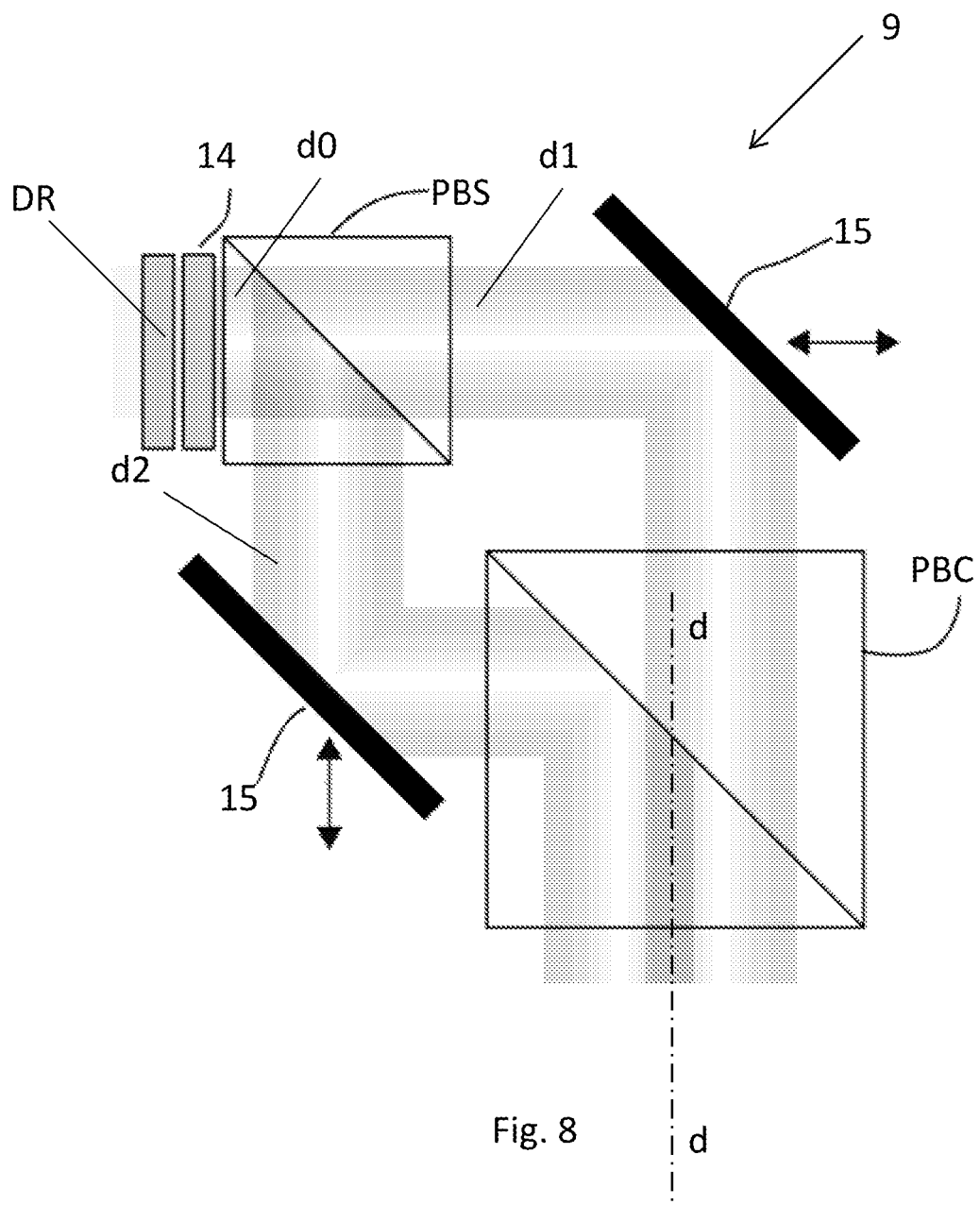
FIG. 8 shows an embodiment of a generating unit 9 of FIG. 7.

As regards the generating unit 9, it can for example comprise (refer to FIG. 8):
- at least one shaping device 14 of said depletion radiation DR, optionally one vortex phase plate, configured to receive in input one depletion radiation DR, and produce in output at least one donut beam d0;
- at least one beam splitting device PBS, configured to receive in input said donut beam d0, and output at least two donut beams d1 and d2,
- at least one combining device PBC for said donut beams d1 and d2, configured to receive in input said two donut beams d1 and d2, and output said two depletion beams DB and DB', with the respective propagation axes parallel and spaced apart from each other.

Advantageously, the microscope according to the present invention also comprises devices 15 for adjusting the distance between said depletion beams DB and DB'. Such adjustment devices, which in the example shown are placed in the generating unit 9 between said separator device PBS and said combining device PBC, comprise for example one pair of translatable mirrors 15, each mirror being configured to redirect one respective donut beam d1 or d2 toward said combining device PBC.

The translation direction of one mirror 15 is substantially orthogonal to the translation direction of the other mirror 15 (see bi-directional arrows in FIG. 8) and, depending on the mutual position of the adjusting devices 15, the depletion beams DB and DB', generated when the microscope of the present invention is turned on, will be more or less spaced from one another and will be delivered in input to the rear opening 2 of the objective lens 3, with the respective propagation axes at a distance equal to or different with respect to the center 3 of the lens opening.

According to one variant of the microscope of the present invention, the generating unit 9 can comprise, as an alternative to what described above,
- at least one spatial light modulator device (Spatial light modulator or SLM), configured to receive in input said depletion radiation DR, and output two donut beams (d1, d2), which donut beams diverge from each other, and
- at least one pair of lenses, each placed along the optical path of a respective donut beam, configured in such a way as to collimate and combine said at least two donut beams (d1, d2) into said at least two depletion beams (DB, DB'), in a known way for the skilled person, having the respective propagation axes parallel and spaced apart with respect to each other.

In this case, the devices for adjusting the distance between the depletion beams DB and DB' thus generated, comprise elements for varying the pattern of the spatial light modulator device SLM, that influences, as is known, the divergence between said donut beams d1 and d2 in output from the SLM device.

As will be appreciated, the depletion radiation source 6 may comprise only one depletion radiation source, or two or more depletion radiation sources (not shown in the Figures).

In the case of two depletion radiation sources DR, the generating unit 9 comprises, according to one variant of the microscope of the present invention,
- at least one shaping device 14 for each depletion radiation (for example, one vortex phase plate), configured to receive in input one depletion radiation, and produce in output at least one respective donut beam d1 or d2; and
- at least one combining device (PBC) of said donut beams, configured to receive in input one donut beam from each shaping device, and output said two depletion beams DB and DB', with the respective propagation axes parallel and spaced with each other.

In this case, the devices 15 for adjusting the distance between said depletion beams DB and DB' are located along the optical path between each shaping device 14 and said combining device PBC and comprise at least one translatable and/or tiltable mirror in a known way for the skilled person, wherein each translatable and/or tiltable mirror is configured to redirect one respective donut beam (d1 or d2) toward said combining device PBC.

The transmission elements comprise redirection elements of the excitation beam EB and of said at least two depletion beams DB and DB', for example one or more translatable and/or tiltable redirection mirrors 8a, 8B, 8c and 8D, configured to transmit the excitation beam EB and the depletion beams DB and DB' so that they can enter into said rear opening 2 of said objective lens L with the respective propagation axes non aligned, parallel to each other and parallel to the main axis (z-z) of the objective lens L.

The microscope described above can effectively use objective lenses L at high magnification/high numerical aperture (NA), and objective lenses at reduced magnification/reduced NA, for example greater than or equal to 1.

Given the tri-dimensional high resolution obtainable with such a microscope, due to the fact that the fluorescence volume is delimited also along the main axis of the objective lens, also lenses commonly used in brain imaging but until now never used for SR imaging, due to the impossibility of reducing the problems of optical aberration and poor resolution of traditional methods, can be employed.

The lightening and depletion microscopy method according to the invention, as well as the corresponding microscope, reach the objects in the introduction.

First, the methods using depletion beams that have a spatial offset with respect to the excitation beam, allow obtaining at the focal point, an effective fluorescence volume limited also in the axial direction and therefore an increase of optical resolution both lateral and axial.

Figure 9:
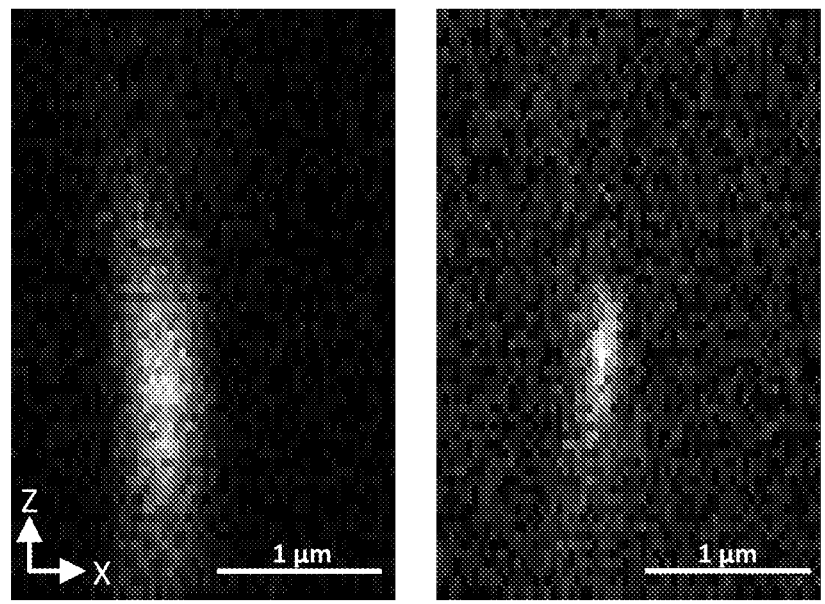
FIG. 9 is a comparative representation of the effective fluorescence volume obtainable through the application of a traditional microscopy method (left) and the depletion microscopy method according to the present invention (right).

This is absolutely evident by observing enclosed FIG. 9, which is a comparative representation of the effective fluorescence volume obtainable through the application of a traditional microscopy method (left) and the depletion microscopy method according to the present invention (right). In the image on the right, it can be observed how the effective fluorescence volume is limited also in the axial direction, other than laterally with respect to the traditional method.

Not only, depending on the inclination of the depletion beams an effective fluorescence volume can be obtained, limited also in the axial direction, having more or less large size, for example comprised between 0% and 80% of the effective fluorescence volume obtainable with traditional methods, which make use of depletion beams.

Moreover, the use of depletion beams allows the methods of the present invention to make the optical system less sensitive to optical aberration, thereby allowing an imaging at greater depth within thick and optically inhomogeneous samples.

Thus, the methods of the present invention allow easily implementing a 3D SR microscopy in all types of biological sample.

Finally, the methods according to the invention can be implemented in a way that is easy and does not require, contrary to the prior art, one mirror above the biological sample, nor the acquisition of multiple images taken sequentially from different angles, thereby they are also easy to implement.

In the foregoing the preferred embodiments were described and some modifications of this invention have been suggested, but it should be understood that those skilled in the art can make modifications and changes without departing from the relative scope of protection, as defined by the appended claims.

Thus for example, steps 10 and 20 of the lightening method described above do not necessarily have to be performed in the order shown in the enclosed figures but can be carried out in reverse order or simultaneously.

According to another example, provided the first propagation axis (a-a) of the excitation beam and the second propagation axes (b-b, b'-b') of the depletion beams are angularly mutually inclined in the path between the objective lens and the biological sample S, and intersecting on said at least one biological sample S, only at the focal point F of said at least one objective lens L, it is possible to implement the invention described above, mutatis mutandis, so that, at the focal point F, also the excitation beam is inclined with respect to the main axis (z-z) of the objective lens or in such a way that the excitation beam is inclined with respect to the main axis (z-z) of the objective lens and one of the depletion beams (DB or DB') is aligned with respect thereto.

The invention claimed is:

1. Lightening method of at least one biological sample, in which said at least one biological sample includes at least one or more fluorophores, at the focal point of at least one objective lens having a main optical axis, the method comprising the following operational steps:
   lightening said at least one biological sample with at least one excitation beam, which propagates between said at least one objective lens and said at least one biological sample along at least one first propagation axis;
   lightening said at least one biological sample with at least two depletion beams, which propagate between said at least one objective lens and said at least one biological sample along the respective second propagation axes, said depletion beams being donut-shaped, each one in a plane orthogonal to the respective second propagation axis;
   whereby said at least one first propagation axis and said at least second propagation axes are angularly inclined with each other, and said at least one first propagation axis and said second propagation axes intersect on said at least one biological sample only at the focal point of said at least one objective lens, so that an effective fluorescence volume is generated in said at least one biological sample which is limited both orthogonally and axially with respect to said main optical axis.

2. The method according to claim 1, wherein said step of lightening said at least one biological sample with at least two depletion beams, each along a respective second propagation axis, comprises:
   deliver at least one depletion radiation;
   obtaining, from said at least one depletion radiation, at least two depletion beams; and
   supplying said at least two depletion beams, into a rear opening of said at least one objective lens, so that they enter into said rear opening substantially parallel to each other and to the main axis of said at least one objective lens, with the center of said rear opening of said at least one objective lens comprised between the centers of said two depletion beams, whereby said two depletion beams exit from said at least one objective lens substantially inclined with each other.

3. The method according to claim 2, wherein said step of obtaining from said at least one depletion radiation at least two depletion beams, comprises:
   obtaining at least one donut beam, from said at least one depletion radiation (DR),
   splitting said at least one donut beam into at least two donut beams, and
   combine said two donut beams in respective depletion beams which propagate substantially parallel to and spaced apart from each other, along a common path (d-d).

4. The method according to claim 2, wherein said step of obtaining from said at least one depletion radiation at least two depletion beams comprises one step of adjusting the mutual distance between said propagation axes of said depletion beams.

5. The method according to claim 4, wherein said one step of adjusting also adjusts the distance between the center of said rear opening of said at least one objective lens and the center of each one of the two depletion beams.

6. High resolution three-dimensional microscope, comprising:
   at least one source of an excitation radiation, configured to deliver at least one excitation radiation;
   at least one source of depletion radiation, configured to deliver at least one depletion radiation;
   at least one objective lens having a main optical axis and a focal point;
   at least one generation unit, configured to receive in input said at least one depletion radiation and to output the at least two donut shaped depletion beams;
   one or more transmission elements configured to transmit said at least one excitation radiation in the form of at least one excitation beam, between said at least one source and said at least one objective lens, and transmit said at least two depletion beams between said at least one generation unit and said at least one objective lens;
   wherein said at least one objective lens is configured to transmit said at least one excitation beam and said at least two depletion beams toward one biological sample, said at least one biological sample including at least one or more fluorophores and being comprised into an observation volume along said main optical axis and at the focal point of said at least one objective lens;
wherein said at least one generation unit, said transmission elements and said at least one objective lens are configured in such a way that when the microscope is in operation, said at least one excitation beam propagates between said at least one objective lens and said at least one biological sample along at least one first propagation axis, whereby said at least two depletion beams propagate between said at least one objective lens and said at least one biological sample along respective second propagation axes, so that said at least one first propagation axis and said second propagation axes intersect, on said at least one biological sample, only at the focal point of said at least one objective lens, for which an effective fluorescence volume is generated into said at least one biological sample, which is limited both orthogonally and axially with respect to said main optical axis.

7. The method according to claim 2, wherein the center of said rear opening of said at least one objective lens is comprised between the centers of said two depletion beams, at the same distance therefrom.

8. The method according to claim 1, wherein said at least two depletion beams de-energize at least one sub-set of said at least one or more fluorophores into said biological sample by stimulated emission or relaxation of the triplet state or by means of a mechanism of photo switching of said at least one sub-set of said at least one or more fluorophores.

9. The method according to claim 1, wherein said step of lightening said at least one biological sample with at least one excitation beam along at least one first propagation axis comprises the steps of:
delivering at least one excitation radiation in the form of at least one excitation beam; and
supplying said at least one excitation beam, into a rear opening of said at least one objective lens, in such a way that it enters into said rear opening of said at least one objective lens substantially parallel or aligned with respect to said main axis, and it exits from said at least one objective lens substantially inclined or aligned with respect to said main axis.

10. Depletion microscopy method of at least one biological sample including at least one or more fluorophores, at the focal point of at least one objective lens having a main optical axis, the method comprising the following operational steps:
lightening said at least one biological sample wherein said at least one biological sample includes at least one or more fluorophores, at the focal point of at least one objective lens having a main optical axis, the method comprising the following operational steps:
lightening said at least one biological sample with at least one excitation beam, which propagates between said at least one objective lens and said at least one biological sample along at least one first propagation axis;
lightening said at least one biological sample with at least two depletion beams, which propagate between said at least one objective lens and said at least one biological sample along the respective second propagation axes, said depletion beams being donut-shaped, each one in a plane orthogonal to the respective second propagation axis; whereby said at least one first propagation axis and said at least second propagation axes are angularly inclined with each other, and said at least one first propagation axis and said second propagation axes intersect on said at least one biological sample only at the focal point of said at least one objective lens, so that an effective fluorescence volume is generated in said at least one biological sample which is limited both orthogonally and axially with respect to said main optical axis;
acquiring at least one fluorescence signal emitted from said at least one biological sample;
processing said at least one fluorescence signal into an image of said at least one biological sample.

11. The microscope according to claim 6, wherein said at least one objective lens is a lens having a numerical aperture greater than or equal to 1.

12. The microscope according to claim 6, wherein said at least one generation unit, comprises:
at least one shaping device of said depletion radiation, configured to receive in input said depletion radiation, and produce in output at least one donut beam;
at least one beam splitting device, configured to receive in input said at least one donut beam, and output at least two donut beams,
at least one combining device for said donut beams, configured to receive in input said at least two donut beams, and output said at least two depletion beams, with said respective second propagation axes parallel and spaced apart from each other.

13. The microscope according to claim 12 including adjusting devices for the distance between said second depletion beams, said adjusting devices for said distance being placed between said splitting device and said combining device and comprising a pair of translatable mirrors, each mirror being configured to redirect a respective donut beam toward said combining device.

14. The microscope according to claim 12, wherein said at least one shaping device is a vortex phase plate.

15. The microscope according to claim 11, wherein said at least one generation unit comprises:
at least one spatial light modulator device, configured to receive in input said depletion radiation, and output at least two donut beams, which donut beams diverge from each other, and
at least one pair of lenses, each set along the optical path of a respective donut beam, configured in such a way as to collimate and combine said at least two donut beams into said at least two depletion beams, having said respective second propagation axes parallel and spaced apart with respect to each other.

16. The microscope according to claim 15, including adjusting devices, configured to adjust the distance between said at least two depletion beams, said adjusting devices for said distance comprising elements for varying the pattern of said spatial light modulator device.

17. The microscope according to claim 11, wherein said at least one source depletion radiation comprises two sources of depletion radiation, and wherein said at least one generation unit comprises:
at least one shaping device configured to shape each depletion radiation, said at least one shaping device being configured to receive in input one respective depletion radiation and output a respective donut beam; and
at least one combining device of said donut beams, configured to receive in input one donut beam from each shaping device, and output said two depletion beams, with the respective propagation axes parallel and spaced between with each other.

18. The microscope according to claim 17, including adjusting devices configured to adjust the distance between said depletion beams, said adjusting devices for said distance being placed along the optical path between each shaping device and said combining device and comprising at least one translatable and/or tiltable mirror, each mirror being configured to redirect a respective donut beam toward said combining device.

19. The microscope according to claim 17, wherein said at least one shaping device is a vortex phase plate.

20. The microscope according to claim 11, comprising redirection elements, configured to redirect said at least one excitation beam and said at least two depletion beams, so that they enter into said rear opening of said at least one objective lens with the respective propagation axes not aligned and parallel with each other.

* * * * *